United States Patent [19]

Shefler

[11] Patent Number: 4,571,463
[45] Date of Patent: Feb. 18, 1986

[54] METHOD AND SYSTEM FOR AUTOMATICALLY INSERTING AT LEAST ONE PAUSE INTO MEANS FOR MEMORIZING A DIALING SEQUENCE

[75] Inventor: Gerald E. Shefler, Milwaukie, Oreg.

[73] Assignee: Code-A-Phone Corporation, Clackamas, Oreg.

[21] Appl. No.: 616,317

[22] Filed: Jun. 1, 1984

[51] Int. Cl.⁴ ...................... H04M 1/274; H04M 3/44
[52] U.S. Cl. .............................. 179/90 B; 179/90 BD; 179/18 BA; 179/84 VF
[58] Field of Search ........... 179/90 B, 90 BB, 90 BD, 179/90 K, 81 R, 84 VF, 2 DP, 5 R, 5 P, 18 B, 18 BA

[56] References Cited

U.S. PATENT DOCUMENTS

| | | | |
|---|---|---|---|
| 4,053,718 | 10/1977 | Derveaux | 179/90 B |
| 4,126,768 | 11/1978 | Grenzow | 179/90 B |
| 4,160,124 | 7/1979 | Law | 179/2 DP |
| 4,201,887 | 5/1980 | Burns | 179/2 DP |
| 4,342,882 | 8/1982 | Gravenhorst et al. | 179/90 B |
| 4,406,926 | 9/1983 | Duncan | 179/84 VF |
| 4,434,326 | 2/1984 | Koeck et al. | 179/2 DP |
| 4,469,916 | 9/1984 | deBergh et al. | 179/2 DP |
| 4,503,291 | 3/1985 | von Holten et al. | 179/90 AN |
| 4,513,175 | 4/1985 | Smith | 179/18 BA |

Primary Examiner—Gene Z. Rubinson
Assistant Examiner—Elio DiVito
Attorney, Agent, or Firm—Kendrick, Netter & Bennett

[57] ABSTRACT

A system for automatically storing one or more pauses in a device for memorizing a dialing sequence such as a telephone number includes a device for instantaneously detecting the appearance, persistence and interruption of a substantially continuous signal on a line such as a telephone line in a time period shorter than a human listener requires to perceive this signal and dial one number of the sequence; a device for detecting engagement of a key for generating, on the telephone line, a signal representing at least one member of the dialing sequence; a device for delaying generation of the signal associated with the engaged key to test for persistence or interruption of the substantially continuous signal on the telephone line in a time period substantially imperceptible to the human listener; and a device for memorizing each member of the dialing sequence at its correct position in the sequence with a pause automatically stored before any member if the substantially continuous signal persisted on the telephone line after engagement of the key representing that member.

13 Claims, 3 Drawing Figures

METHOD AND SYSTEM FOR AUTOMATICALLY INSERTING AT LEAST ONE PAUSE INTO MEANS FOR MEMORIZING A DIALING SEQUENCE

This invention relates to a system and to a method for storing, automatically, and at the appropriate locations, one or more pauses in a dialing sequence that, in preferred embodiment, comprises a telephone number preceded or followed by one or more pauses.

All telephones and automatic dialers that include a last number redial feature have a common problem when used behind a PBX. A pause must be manually programmed into redial memory at all locations in the dialing sequence where the dialer must wait for a dial tone or misdialing may occur. Any digits dialed before a dial tone is available, whether dialed automatically or manually, are ignored. If the telephone user has any reason to believe he or she may wish to use the last number redial function in a telephone system behind a PBX, he or she must remember to program pauses into the dialing sequence manually as he or she dials the number initially. Routine dialing becomes unnecessarily awkward and inconvenient if the user must manually insert the required pauses into memory as needed.

This invention provides a system for automatically entering pauses into means for memorizing dialing sequences that include, in preferred embodiment, a telephone number, when the number is initially dialed behind a PBX or analogous device. This system enters a pause at each point in the dialing sequence where the dialer must wait or pause for the appearance of a substantially continuous signal on the line. This system is not limited to storing pauses at specific memory locations, nor is the system limited to the number of pauses that can be entered. If no pause is required, the system enters none. Importantly, each pause is entered automatically, and without any action required by the user, eliminating inconvenience to a user where redialing is or may be desirable.

The system of this invention automatically stores at least one pause into means for memorizing a dialing sequence, but can store as many pauses as necessary in the correct position in the dialing sequence without the intervention of the system's user. The system comprises means for detecting the appearance, persistence and interruption of a substantially continuous signal such as dial tone on a line in an information transmission network such as a telephone system. This detecting means performs its function within a very short time period, typically within several microseconds. This time period is substantially shorter than a human listener requires to perceive the appearance of the substantially continuous signal, and to engage means (such as a key) for generating a signal representing one member of a dialing sequence. An example of such a member is a number or letter in a telephone number.

The system also includes means for detecting engagement of means for generating, on a line such as a telephone line, a tone or pulse signal representing at least one member of a dialing sequence. The system further includes means for delaying generation of such a tone or pulse signal for a time sufficient to detect persistence or interruption of a substantially continuous signal on the line, but within a time substantially imperceptible to a human listener.

The system also includes means for memorizing each member of a dialing sequence, at its correct position in the sequence, and means for storing a pause, automatically, before any member of the sequence. Our system stores pauses at as many locations in the sequence as necessary, but only if a substantially continuous signal persists on the line during the split-second delay that follows engagement of a key or other means for generating a signal representing a member of a dialing sequence.

In preferred embodiment, when a means for generating a signal representing at least one member of a dialing sequence is engaged, the system mutes or disables all other means within the system for placing other signals on the line during the delay. For example, the system preferably disables the microphone in the receiver/transmitter unit of the telephone that includes our system. During the delay, the means for detecting the persistence or interruption of a substantially continuous signal such as a dial tone on the line will be looking only for such signals and no others. After the splitsecond delay ends, and the signal representing the member of the dialing sequence has been registered in the means for memorizing the dialing sequence along with a pause, if necessary, this system again enables all necessary signal-transmitting means that were disabled during the delay, such as the microphone in the receiver/transmitter unit.

The new method for automatically storing at least one pause into means for memorizing a dialing sequence comprises detecting a substantially continuous signal (e.g., dial tone) on a line such as a telephone line in an information transmission network such as a telephone system for a fixed or predetermined time. This time, typically several microseconds, is shorter than necessary for a human listener to perceive the presence of a dial tone on the line and to engage means such as a key for generating a signal representing one member of the dialing sequence such as a number or letter in a telephone number. Thereafter, our method comprises detecting engagement of means for generating such a signal, and immediately delaying the generating of such a signal for a split second. This time delay is sufficient to detect persistence or interruption of dial tone on the line, but within a time period substantially imperceptible to a human listener.

Our method also comprises storing each member of a dialing sequence at its appropriate location in the means for memorizing the sequence, and for automatically storing pause data in memory where, and as necessary. Our method stores such pauses if, but only if, a dial tone persists on the line during the delay following engagement of a key, and for a fixed, predetermined time before the delay began, or for a fixed, predetermined time period that overlaps, and ends not later than the end of the delay.

This invention can be better understood by reference to the drawings in which.

Figure 1:
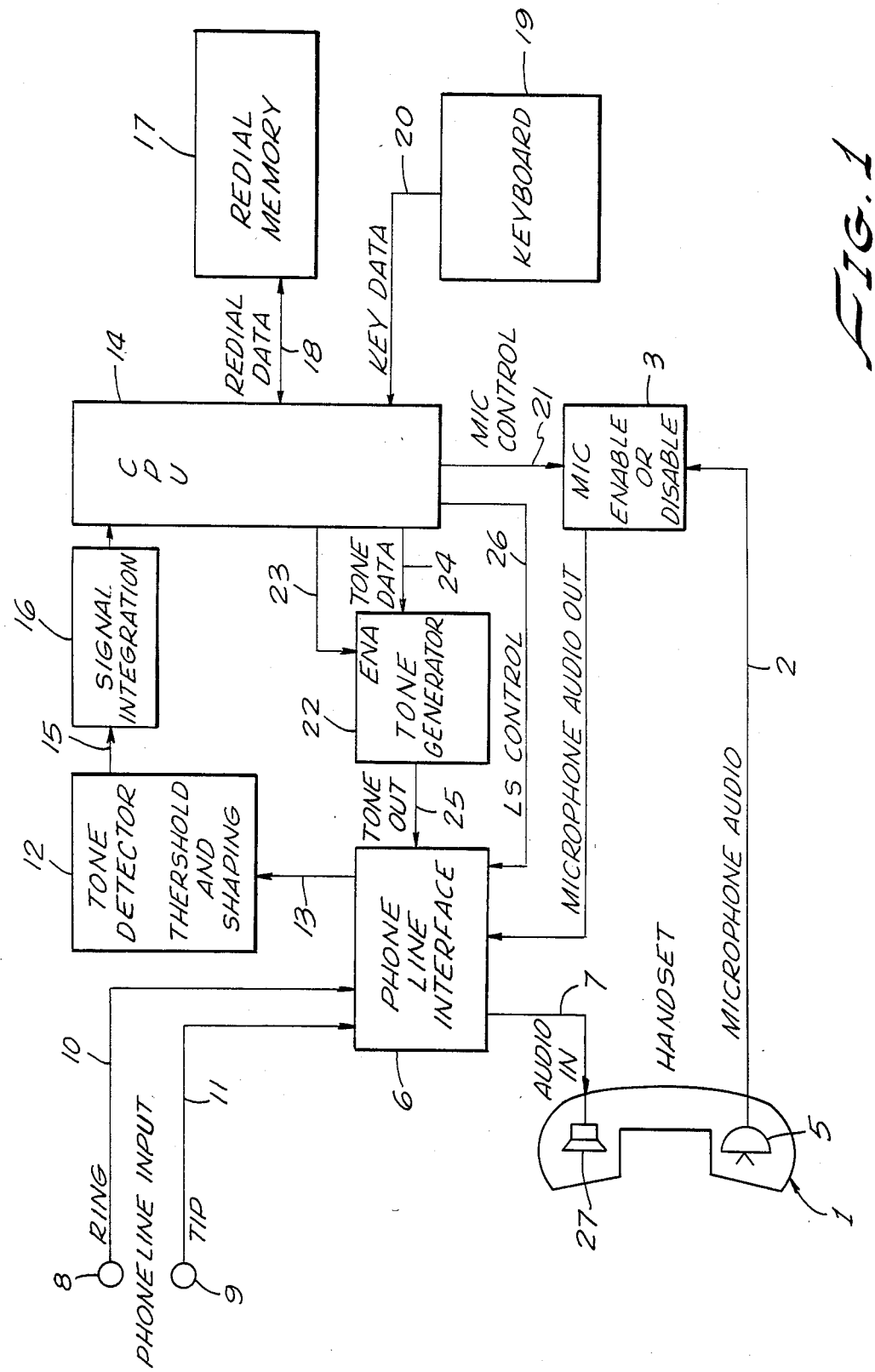
FIG. 1 is a block diagram of the preferred embodiment of this new system.

FIG. 1 shows a telephone handset 1 with a microphone 5 linked on path 2 to microphone enabling/disabling means 3. Enabling/disenabling mechanism 3 is linked to conventional phone line interface 6 on path 4, and interface 6 is linked to handset/receiver 1 on path 7.

Interface 6 includes means for connecting the telephone, including handset/receiver 1, to telephone line 10/11. Interface 6 also includes means for conditioning audio signals from microphone 5 for transmission on line 10/11, and for converting signals for receiver 27. Interface 6 also includes means for transmitting tone or pulse signals onto line 10/11.

Terminals 8 and 9 are the ring and tip sides, respectively, of a telephone line linked to telephone line interface 6 on ring path 10 and tip path 11. Path 13 links tone detector 12 to telephone line interface 6. Path 15 links tone detector 12 to microprocessor 14 through signal integrator 16. Integrator 16 receives a series of pulses from detector 12, and presents a continuous signal to microprocessor. Although the signal integrator 16 shown here is external to microprocessor 14, signal integration may also be effected by appropriate softwate timing adjustments in the program for running the microprocessor. Processor 14 is linked to redial memory 17 through path 18.

A dialing sequence begins with engagement of a key on keyboard 19. A signal representing the engaged key passes to processor 14 on path 20. Processor 14 issues enable/ disenable commands to enabler/disenabler 3 on path 21. Processor 14 enables and disenables DTMF tone or pulse generator 22 by a signal on path 23, and passes data to generator 22 on path 24. Signals from generator 22 pass to telephone line interface 6 on path 25. (Generator block 22 can be either a tone generator, a pulse generator or means that can function as either a tone or pulse generator.)

Figure 2A:
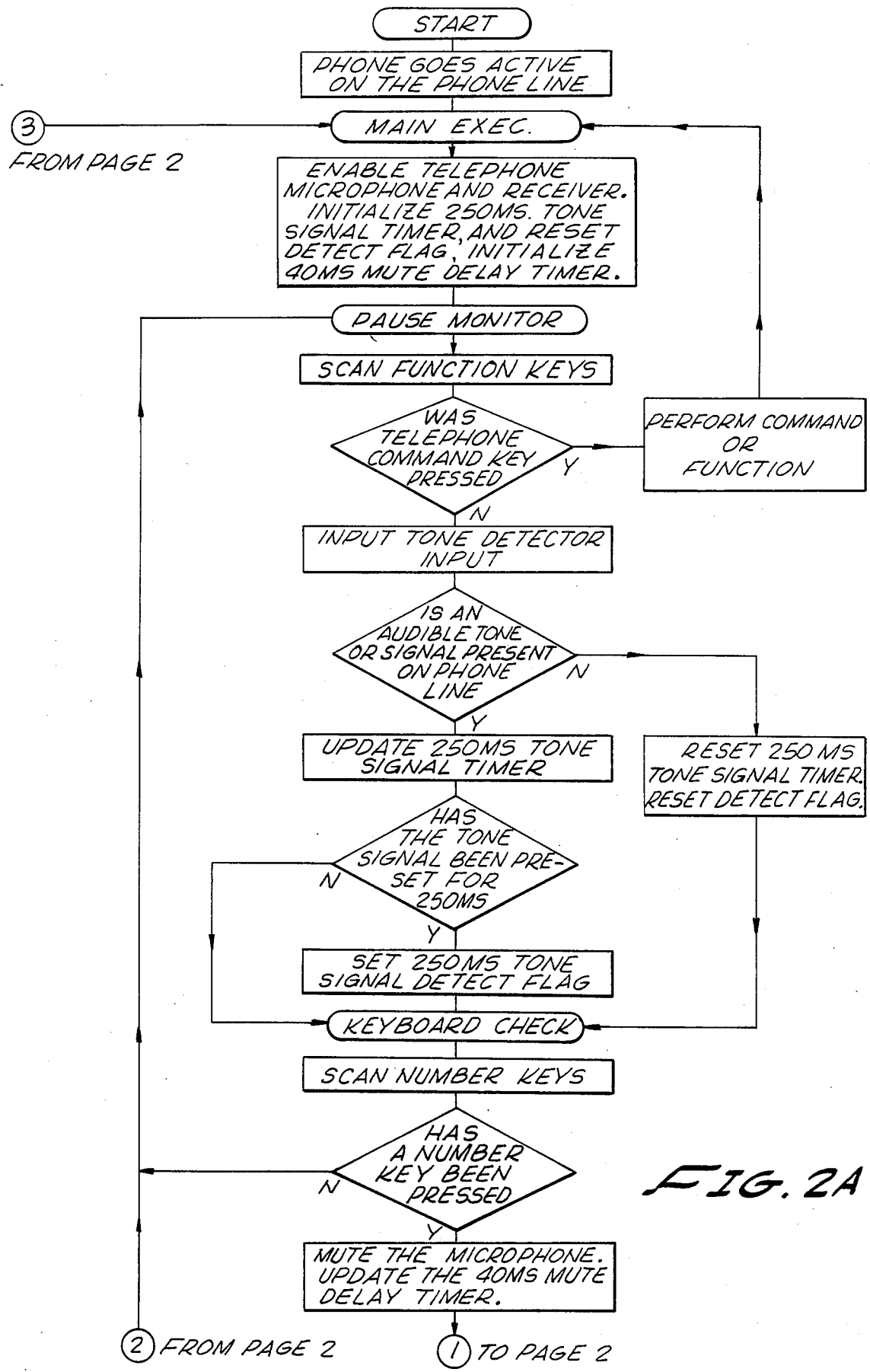
FIGS. 2a and 2b are flow sheets showing the steps in the preferred embodiment of this new method.
Figure 2B:
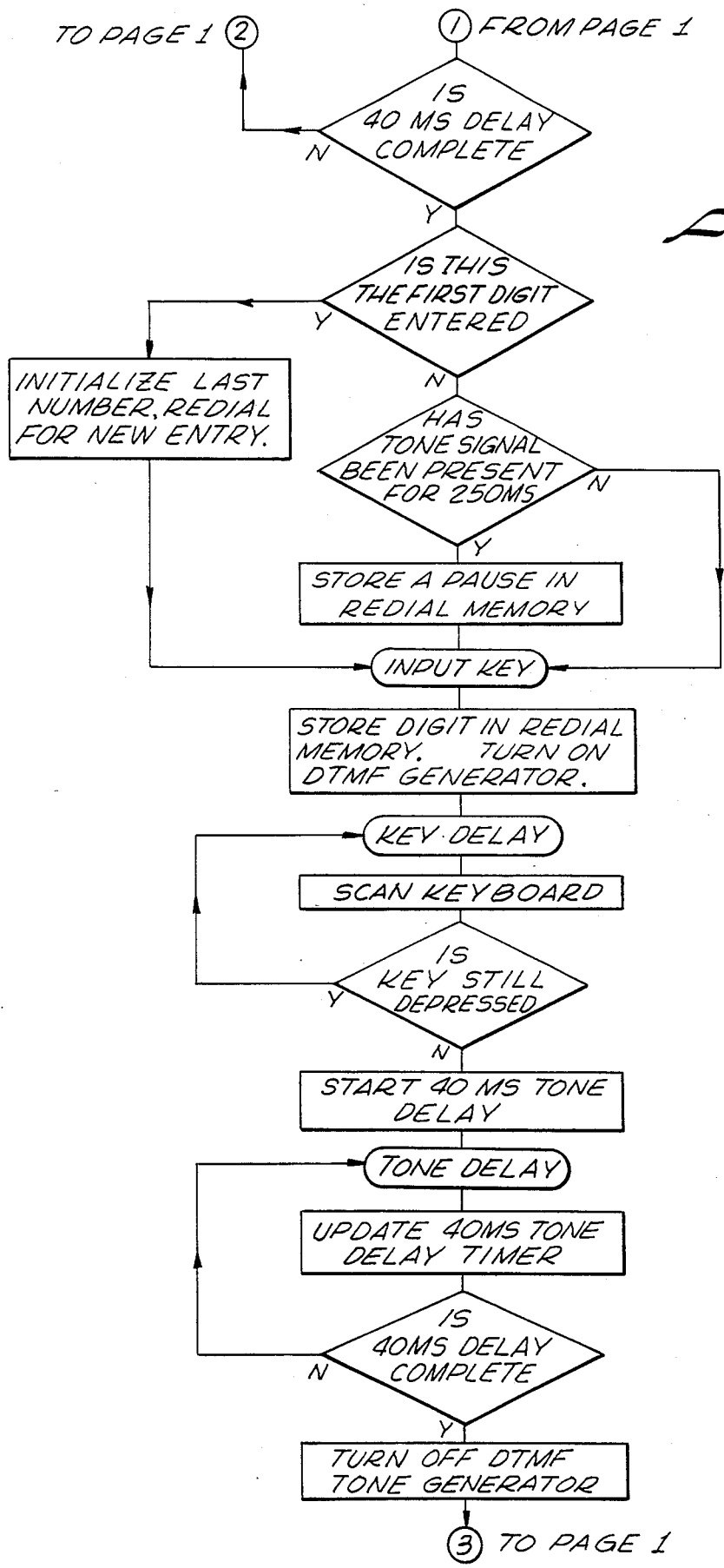

The operation of the embodiment of our new system illustrated in FIG. 1 can be readily understood by reference to the flowsheet in FIG. 2. When handset 1 is lifted from its receiver, or upon command from keyboard 19 to seize line 10/11, the telephone interface circuit 6 becomes active on line 10/11. Our new system enables microphone 5 and receiver 27 in handset 1, resets a tone signal timer that times dial tone on line 10/11, resets all flags that denote occurrence of a timing or other event, and resets a second timer to monitor the delay after engagement of a key on keyboard 19.

The label, "pause monitor," on the flowchart in FIG. 2 indicates that our system then continually scans for engagement of a command or number key on keyboard 19 by looking for a signal on path 20 indicating that a command key or a number key has been engaged or pressed. If so, our system then performs the selected command or function. If not, our system scans for the presence of dial tone on line 10/11. If dial tone is present on line 10/11 for a predetermined time, such as 250 milliseconds in this example, then our system registers a signal detect flag.

The tone signal timer, although programmed for 250 milliseconds in this embodiment, can be for any time that is less than the time necessary for a human listener to perceive dial tone on line 10/11, and to engage a key on keypaid 19.

Our system also scans for engagement of any number or letter key on keyboad 19. If a number or letter key has been engaged, our system disables or mutes microphone 5 in handset 1. A muting signal from processor 14 passes on path 21 to enabler/disenabler 3, and then on path 2 to microphone 5. Simultaneously, our system initializes, and begins timing a split-second delay, here a 40 millisecond delay, while testing for detection or dial tone on line 10/11. Tone detector 12 receives dial tone from telephone line interface 6, via path 13, and conveys a signal representing the persistence or interruption of dial tone on line 10/11 to signal integrator 16 and to processor 14 on path 15.

At the end of the 40 millisecond delay, our system determines whether or not dial tone has persisted on line 10/11 for a 250 millisecond period ending before, during or coincident with the end of the 40 millisecond delay. If dial tone has been present on line 10/11 for this period, our system stores a pause in redial memory 17 before storing the member of the dialing sequence corresponding to the engaged key. If no dial tone is present on line 10/11 for this delay, then our system stores only the member of the dialing sequence, but no pause.

In preferred embodiment, if the number or letter key engaged at keyboard 19 is the first in the dialing sequence, our system does not store a pause before storing that member in memory. However, our system can be arrayed to provide for storage of a pause before the first member, if necessary or desirable.

After storing a member of the dialing sequence in the memory and a pause, if necessary, our system then determines whether or not the key on keypad 19 is still engaged. While the key is engaged, our system transmits the signal that the engaged key represents, and continues to transmit that signal for another 40 milliseconds after the key is released. Our system then turns tone generator 22 off, terminating transmission of tone to telephone line interface 6 and telephone line 10/11, and resets itself to await engagement of another key on keyboard 19.

Although our system, in preferred embodiment, stores each member of a dialing sequence before activating tone generator 22, the storage can take place later, but must take place before engagement of another key, or the same key again. Moreover, redial memory 17 can be part of processor 14, if desired.

What is claimed is:

1. A method for storing data representing at least one pause in a sequence of data representing a dialing sequence into means for memorizing said dialing sequence comprising detecting a substantially continuous signal on a line in an information transmission network for a time interval insufficient for a human listener to perceive said substantially continuous signal and insufficient for said human listener to thereafter engage means for generating a signal representing at least one member of said dialing sequence; detecting engagement of means for generating, on said line, a signal representing at least one member of said dialing sequence; immediately after detecting said engagement, delaying said generating for a time interval sufficient to detect persistence or interruption of said substantially continuous signal, but for a time interval substantially imperceptible to a human listener; storing data representing each of said members in said memory means at its correct position in said dialing sequence; and automatically storing data representing a pause in said data sequence in said memory means before any member in response to detection of said substantially continuous signal before and after detecting engagement of said generating means.

2. The method of claim 1 wherein said line is a telephone line, and the signal representing each member of said dialing sequence is a tone signal.

3. The method of claim 1 wherein said line is a telephone line, and the signal representing each member of said dialing sequence is a pulse signal.

4. The method of claim 1 further comprising preventing transmission of speech signals onto said line during the delay that follows immediately after detecting engagement of said generating means.

5. A system for automatically storing data representing at least one pause in a sequence of data representing a dialing sequence comprising means for memorizing a dialing sequence and said at least one pause in the correct order; means for detecting the appearance, persistence and interruption of a substantially continuous signal on a line in an information transmission network within a time period substantially shorter than a human listener requires to perceive said substantially continuous signal and to engage means for generating a signal representing at least one member of said dialng sequence; means for detecting engagement of means for generating, on said line, a signal representing at least one member of said dialing sequence; means for delaying said generating immediately after said detecting said engagement for a time sufficient to detect persistence or interruption of said substantially continuous signal on said line, but within a time period substantially imperceptible to a human listener; and means for automatically storing data representing a pause in said dialing sequence in said memorizing means before storing data representing any member of said dialing sequence if said substantially continuous signal is detected before, and persists on said line uninterrupted after said engagement.

6. The system of claim 5 wherein the dialing sequence comprises a telephone number.

7. The system of claim 5 wherein each signal representing each member of said dialng sequence is a tone signal.

8. The system of claim 5 wherein each signal representing each member of said dialing sequence is a pulse signal.

9. The system of claim 5 further comprising means for preventing transmissin of other signals onto said line from means linked to said system during said delaying of said generating.

10. A method for storing data representng at least one pause in a sequence of data representing a dialing sequence into means for memorizing said dialing sequence comprising detecting dial tone on a telephone line for a time interval insufficient for a human listener to perceive said dial tone, and thereafter engaging means for generating a digit in said dialing sequence; detecting engagement of means for generating, on said line, a signal representing at least one member of said dialing sequence; immediately after detecting said engagement, delaying said generating for a time interval sufficient to detect persistence or interruption of said dial tone, but for a time interval substantially imperceptible to a human listener; storing data representing each of said members in said means for memorizing at its correct position in said dialing sequence; and automatically storing data representing a pause in said data sequence and in said means for memorizing before any member of said sequence in response to detection of said dial tone before and after detecting engagement of said generating means.

11. The method of claim 10 further comprising preventing transmission of any signal onto said line during the delay that follows immediately after detecting engagement of said generating means.

12. A system for automatically storing data representing at least one pause in a sequence of data representing a dialing sequence comprising means for memorizing a dialing sequence and said at least one pause, all in the correct order; means for detecting the appearance, persistence and interruption of dial tone on a telephone line within a time period substantially shorter than a human listener requires to perceive said dial tone and to engage means for generating a signal representing at least one member of said dialing sequence; means for detecting engagement of means for generating, on said line, a signal representing at least one member of said dialing sequence; means for delaying said generating immediately after said detecting for a time sufficient to detect persistence or interruption of said dial tone on said line, but within a time period substantially imperceptible to a human listener; and means for automatically storing data representing a pause in said dialing sequence in said memorizing means before storing data representing a dialing sequence member if said dial tone is detected before, and persists on said line uninterrupted after said engagement.

13. The system of claim 12 further comprising means for preventing transmission of other signals onto said line from any means associated with said system during said delaying of said generating.

* * * * *